(12) United States Patent
Shiroyama

(10) Patent No.: US 7,859,864 B2
(45) Date of Patent: Dec. 28, 2010

(54) SWITCHING POWER SUPPLY DEVICE

(75) Inventor: Hironobu Shiroyama, Hino (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 254 days.

(21) Appl. No.: 12/292,712

(22) Filed: Nov. 25, 2008

(65) Prior Publication Data
US 2009/0134859 A1 May 28, 2009

(30) Foreign Application Priority Data

Nov. 28, 2007 (JP) .............................. 2007-307743
Apr. 25, 2008 (JP) .............................. 2008-114705

(51) Int. Cl.
*H02M 3/335* (2006.01)
(52) U.S. Cl. .............. 363/21.12; 363/21.17; 363/21.01; 363/21.18
(58) Field of Classification Search .................. 363/16, 363/20, 21.01, 21.12, 21.15, 21.16, 21.17
See application file for complete search history.

(56) References Cited

U.S. PATENT DOCUMENTS

| | | | | |
|---|---|---|---|---|
| 6,456,511 B1 * | 9/2002 | Wong | ....................... | 363/21.13 |
| 7,184,279 B2 * | 2/2007 | Lee | ........................... | 363/21.02 |
| 2007/0274107 A1 * | 11/2007 | Garner et al. | ............. | 363/21.12 |
| 2008/0031017 A1 * | 2/2008 | Ng et al. | ................... | 363/21.08 |
| 2008/0112193 A1 * | 5/2008 | Yan et al. | .................. | 363/21.08 |
| 2008/0259652 A1 * | 10/2008 | Huynh et al. | ............. | 363/21.12 |
| 2008/0259654 A1 * | 10/2008 | Huynh et al. | ............. | 363/21.16 |

FOREIGN PATENT DOCUMENTS

| | | |
|---|---|---|
| JP | 2003-299351 | 10/2003 |
| JP | 2007-215316 | 8/2007 |

\* cited by examiner

*Primary Examiner*—Bao Q Vu
(74) *Attorney, Agent, or Firm*—Manabu Kanesaka

(57) ABSTRACT

A switching power supply device has lower correction circuit losses, and enables adjustments without affecting overcurrent limiting or other characteristics. An integrated circuit IC for power supply control generates a switching signal based on a feedback signal from a feedback circuit and a voltage signal from a current detection input terminal, and outputs the switching signal from an output terminal to a switching element. A voltage controlled oscillator is provided which, when the load is judged to be light based on the magnitude of the feedback signal, lowers the switching frequency. The correction circuit is connected between the output terminal of the integrated circuit and the signal input terminal for current detection, acts only when the switching element is on, and has the function of further lowering the switching frequency set in the integrated circuit.

9 Claims, 15 Drawing Sheets

Current Detection voltage Signal
(During Heavy Loading)

Current Detection Voltage Signal
(During Light Loading)

Voltage Signal of Output Terminal Out

Voltage Signal at Point A

Current IC0 of Capacitor C0

Voltage Signal at Detection Terminal IS

Inductor Current Waveform 1 ($V_{IN}=V1$)

Inductor Current Waveform 2
($V_{IN}=V2$) (Where V1<V2)

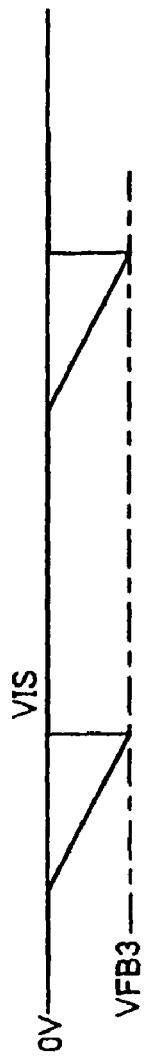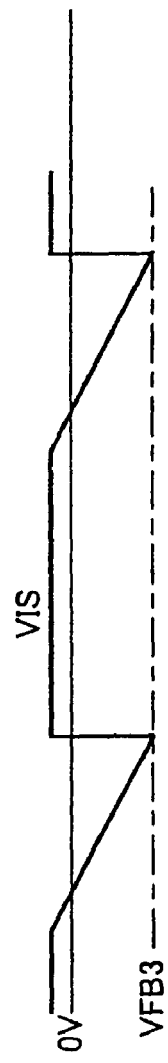

SWITCHING POWER SUPPLY DEVICE

BACKGROUND OF THE INVENTION AND RELATED ART STATEMENT

The present invention relates to a switching power supply device which supplies prescribed output power to a load according to a preset voltage, and in particular relates to a switching power supply device which lowers the switching frequency of a switching element during light loading or no loading or standby (hereinafter also simply called "light loading"), thereby achieving reduced power consumption during light loading or no loading, or reduced standby power during standby.

In the prior art, IC circuits for switching power supply control have been utilized which improve power efficiency by lowering the switching frequency during-light loading, with the aim of lowering switching losses in the switching power supply (see for example Japanese Patent Laid-open No. 2007-215316 (page 1, line 15 to page 13, line 16, FIG. 4, FIG. 5)). In Japanese Patent Laid-open No. 2007-215316 (page 1, line 15 to page 13, line 16, FIG. 4, FIG. 5), a switching power supply control circuit is disclosed employing current mode control (positive detection method), in which the value of the current flowing in the power MOSFET (Metal-Oxide Semiconductor Field Effect Transistor) or other switching element is detected as a positive voltage signal.

FIG. 9 is a block diagram showing the control circuit of a quasi-resonant switching power supply disclosed in Japanese Patent Laid-open No. 2007-215316 (page 1, line 15 to page 13, line 16, FIG. 4, FIG. 5). The quasi-resonant switching power supply of FIG. 9 is shown as only one example of a switching power supply of the prior art. This invention is not limited to quasi-resonant devices, and can also be applied broadly to switching power supplies other than quasi-resonant devices.

In the power supply control circuit 10, a bottom detection circuit (valley detection) 11 is connected to the input terminal ZCD for zero current detection. The bottom detection circuit 11 is a comparator which compares the voltage applied to the input terminal ZCD with a reference voltage close to the 0 V level (threshold); the output terminal of this bottom detection circuit 11 is connected to one of the input terminals of the AND circuit 12, and through the AND circuit 12, is connected to the one-shot circuit 13. The output terminal of the voltage controlled oscillator (VCO) 14 is connected to the other input terminal of the AND circuit 12. The voltage controlled oscillator 14 is an oscillator which changes the output frequency depending on the magnitude of the input voltage (VCO voltage), and comprises a voltage signal input terminal VCO and a reset signal input terminal Reset. The VCO voltage input terminal of the voltage controlled oscillator 14 is connected to the input terminal FB for feedback signal VFB detection, and the input terminal for reset signals Reset is connected to the output terminal of the one-shot circuit 13.

The input terminal FB for detection of the feedback signal VFB is connected to the inverting input terminal (−) of the comparator 15. The non-inverting input terminal (+) of the comparator 15 is grounded via 0.5 V reference power supply E1, and a disable signal Disable is output from the output terminal to the inverter circuit 16. The output of the inverter circuit 16 is connected to the clear terminal (CLR) of the one-shot circuit 13. A 5 V reference power supply E2 is connected via the series circuit of a resistor R and diode D to the input terminal FB, and determines the FB terminal voltage.

The current comparator 17 is connected to the signal input terminal for current detection IS, and a current detection signal is supplied to the non-inverting input terminal (+) among the four input terminals of the current comparator 17. The remaining three inverting input terminals (−) are connected respectively to the input terminal for feedback signal VFB detection FB, the 1 V reference power supply E3, and the output terminal of the soft-start circuit 18. The output terminal of the current comparator 17 is connected to the reset terminal R of the flip-flop circuit 19. The set terminal S of the flip-flop circuit 19 is connected to the output terminal of the one-shot circuit 13. The Q output terminal of the flip-flop circuit 19 is connected via the AND circuit 20 to the output terminal OUT, and the output signal Q of the flip-flop circuit 19 is output to the power MOSFET or other externally connected switching element Q1 (see FIG. 10 below) as a switching signal from the output terminal OUT. The soft-start circuit 18 generates a soft-start signal, which limits the turn-on interval of the switching element Q1 during startup of the switching power supply.

The inverting input terminal (−) of the comparator for overload detection 21 is connected to the input terminal FB for feedback signal VFB detection, and the non-inverting input terminal (+) is grounded via the 3.3 V reference power supply E4. The output terminal of the comparator 21 is connected to the reset terminal Reset of the timer circuit 22. The timer circuit 22 is used to set two delay times; the first output signal (low) is output to the AND circuit 20 100 ms after the comparator 21 detects an overload state, and forcibly halts the supply of the switching signal to the switching element Q1.

The second output signal of the timer circuit 22 is output 800 ms after an overload state is detected, and is supplied as a reset signal to a startup circuit, not shown, provided within the power supply control circuit 10.

In this power supply control circuit 10 for a switching power supply disclosed in Japanese Patent Laid-open No. 2007-215316 (paragraphs [0002] to [0025], FIG. 4, FIG. 5), the voltage applied to the switching element Q1 upon zero-cross detection is the minimum of the resonance waveform, and the switching element Q1 is turned on with this timing to start the next switching cycle, in what is generally called a quasi-resonant type or partial-resonance type switching power supply control.

In the control circuit shown in FIG. 9, during normal operation the current signal of the switching element Q1 is input to the input terminal IS, and the current comparator 17 compares this current signal with the feedback signal VFB input to the input terminal FB; the power supplied to the secondary side is controlled by making the current in the switching element Q1 small when the load is light and making the current in the switching element Q1 large when the load is heavy, executing control so that the output voltage is substantially equal to the voltage setting.

The feedback signal VFB input to the input terminal FB decreases when the load is light and the output voltage is high, and increases when the load is heavy and the output voltage declines. The voltage controlled oscillator 14 lowers the frequency more for a smaller feedback signal VFB, which is the VCO voltage, so that the lighter the load, the lower the oscillation frequency of the voltage controlled oscillator 14, and the heavier the load, the higher the frequency. A detailed explanation is here omitted, but the frequency of the switching signal (the switching frequency) output from the output terminal OUT of the power supply control circuit 10 is governed by the oscillation frequency of the voltage controlled oscillator 14, so that, in essence, the lighter the load, the lower is the switching frequency. This is because in light loading, the fraction of total losses accounted for by switching loss is increased, and so the frequency is lowered with the aim of alleviating the switching loss during light loading. This technique of lowering the switching frequency during light loading is also widely applied to switching power supplies other than quasi-resonant type devices.

The reference voltage E3 (1 V) connected to the current comparator 17 is a reference voltage used to limit overcurrents in the switching element Q1. In the case of an overload and the like, the maximum value of the current signal is limited to the reference voltage E3 (1 V) in order to protect the power supply circuit and the load.

FIG. 10 is a block diagram showing one example of a positive detection-type switching power supply device of the prior art.

The switching power supply device of FIG. 10 supplies power from the primary-side DC input power supply $V_{IN}$ of a transformer T1 to the secondary-side load (not shown) according to a voltage setting. An LC resonance circuit is formed by the inductance (Lp) of the primary-side windings Lp of the transformer T1 and the capacitance of the resonance capacitor Cr (which can also be only the parasitic capacitance of the switching element Q1) connected in parallel with the power MOSFET or other switching element Q1. The input voltage $V_{IN}$ is supplied to one end of the smoothing capacitor C1 and to one end of the primary windings Lp of the transformer T1; the other end of the primary windings Lp is connected to the drain of the switching element Q1. The source of the switching element Q1 is connected, via the sense resistor Rs, to the other end of the smoothing capacitor C1, and the gate is connected via the resistance R1 to the output terminal OUT of the integrated circuit IC.

The integrated circuit IC in the switching power supply circuit of FIG. 10 is for example equivalent to the power supply control circuit 10 of FIG. 9; in FIG. 9, only the zero current detection input terminal ZCD, feedback signal detection input terminal FB, signal input terminal for current detection IS, and the output terminal OUT for output of the control signal to the switching element Q1 are shown.

The primary windings Lp, secondary windings Ls, and auxiliary windings Lb of the transformer T1 are all wound around the same core of the transformer T1. The inductance of the secondary windings Ls is Ls, and the inductance of the auxiliary windings Lb is Lb. The resonance capacitor Cr is connected in parallel with the series circuit of the switching element Q1 and the sense resistor Rs, but may be connected in parallel with the primary windings Lp. The auxiliary windings Lb are connected to a rectifying diode D2 and smoothing capacitor C2 which form the power supply of the integrated circuit IC. The resistor R2 supplies the voltage at the connection point between the switching element Q1 and the sense resistor Rs to the signal input terminal for current detection IS; and the resistor R3 is provided to input the voltage across the auxiliary windings Lb as-is, without rectification, to the input terminal ZCD of the integrated circuit IC. The sense resistor Rs functions as a current detection element.

A diode D3 and smoothing capacitor C3 which rectify the voltage appearing across the secondary windings Ls are provided at the secondary windings Ls of the transformer T1. The anode of the diode D3 is connected to one end of the secondary windings Ls, and the cathode is connected to the power supply output terminal Vout as well as to one end of the smoothing capacitor C3. The other end of the smoothing capacitor C3 is connected to the other end of the secondary windings Ls, as well as to the ground terminal Gnd.

The level at the output terminal OUT of the integrated circuit IC changes between high and low to drive the gate of the switching element Q1, turning the switching element Q1 on and off, and by this means the desired smoothed DC voltage is generated on the side of the secondary windings Ls of the transformer T1, between the power supply output terminal Vout and the ground terminal Gnd. During on intervals, a drain current flows in the switching element Q1, and a current flows on the side of the primary windings Lp of the transformer T1 connected thereto, accumulating energy. Thereafter the switching element Q1 turns off, but by means of the energy accumulated in the transformer T1, a current passes through the diode D3 and flows in the smoothing capacitor C3 on the side of the secondary windings Ls of the transformer T1 during off intervals of the switching element Q1. In this way, a smoothed DC voltage appears on the side of the secondary windings Ls of the transformer T1, between the power supply output terminal Vout and the ground terminal Gnd.

Between the power supply output terminal Vout and the ground terminal Gnd is provided an output detection circuit comprising a series circuit of resistors R5 and R6, a resistor R7, a photodiode PD comprising a phototransistor PT and a photocoupler, a capacitor C4, and a shunt regulator D4. Here, a current flows in the photodiode PD according to the output voltage (the current which flows is larger to the extent that the output voltage is higher than the voltage setting), the photodiode PD emits light in a quantity corresponding to this current, and a feedback signal is supplied to the phototransistor PT connected between the feedback signal detection input terminal FB of the integrated circuit IC and the ground terminal Gnd. The larger the quantity of light emitted by the photodiode PD, the larger the current which flows in the phototransistor PT, and this current flows in the resistor R, so that the voltage drop across the resistor R increases. That is, the higher the output voltage, the larger is the current flowing in the phototransistor PT, so that the feedback signal VFB becomes small. By means of this feedback function, a switching power supply device can supply power according to fluctuations in the load, not shown. The feedback circuit 25 comprises the portions enclosed within the dashed line.

The positive detection switching power supply device shown in FIG. 10 has a sense resistor Rs as a current detection element, and is characterized in comprising an overload protection (OLP; also called overcurrent protection, OCP) function, which protects the load from excessive currents by means of an overcurrent limiting circuit which employs the signal obtained by applying a bias, by means of the resistors R4 and R2, to the current detection signal (the signal itself being a voltage) detected by the sense resistor Rs. In recent devices, reduced power consumption in the power supply control circuit 10 itself has been sought, and a method of reducing the current flowing in the path from the input power supply $V_{IN}$ through the resistors R4, R2, Rs is conceivable. Before explaining this method, first the function of the resistors R4 and R2 is explained.

First, a state in which the resistors R4, R2 are not provided is considered. This overcurrent limiting circuit does not directly monitor overcurrent on the secondary side of the transformer T1, but instead monitors current changes on the side of the primary windings Lp to detect overcurrents to the load and halt switching operation. This is because when directly monitoring the secondary-side load current, a circuit to feed back a signal to the primary side becomes necessary. Specifically, the voltage across the sense resistor Rs which is the current detection element in FIG. 10 is compared with a reference voltage which is an overload protection (OLP) judgment reference (and is hereinafter called the judgment reference voltage Vth), and when the voltage across the sense resistor Rs reaches this reference voltage, it is judged that an overcurrent has occurred.

FIGS. 11(A) and 11(B) show the primary-side current waveforms corresponding to different input voltages. Here, when the respective input voltages $V_{IN}$ are applied as V1 and V2, the positive-detection current detection signal occurring across the resistor Rs is shown as the current waveform corresponding to the inductor current $I_L$ flowing in the primary windings Lp of the transformer T1.

An inductor current $I_L$ begins to flow in the primary windings Lp at the time that the switching element Q1, an N-channel MOS transistor, is turned on, and this current increases with a slope proportional to the input voltage $V_{IN}$ ($dI_L/dt=V_{IN}/Lp$). When the current detection signal reaches the judgment reference voltage Vth for overload protection (OLP), the power supply control circuit 10 (integrated circuit IC) of FIG. 9 judges that an overcurrent is occurring, and the switching element Q1 is turned off.

In the positive-detection type switching power supply device shown in FIG. 10, a response lag time Δt occurs between the time an overcurrent is actually judged to have occurred in the integrated circuit IC and the time the switching element Q1 is turned off. For this reason, as shown in FIGS. 11(A) and 11(B), overshoot exceeding the judgment reference occurs in the inductor current $I_L$ actually flowing in the switching element Q1 at the time of overcurrent limiting operation. While the slope of the inductor current $I_L$ is proportional to the input voltage $V_{IN}$, the response lag time Δt, which is determined by operation of the control system, is regulated by the power supply voltage of the power supply control circuit 10 (the integrated circuit IC in FIG. 10), so that it is not affected by the input voltage $V_{IN}$. Hence upon comparing the current detection signals from the sense resistor Rs for a case in which the input voltage $V_{IN}$ is a small value (V1) as shown in FIG. 11(A), and for a case in which the value is V2 (>V1) shown in FIG. 11(B), the above-described overshoot amount ΔV is larger for higher values of the input voltage $V_{IN}$ (ΔV1<ΔV2).

FIG. 12 shows changes in the inductor current during overcurrent limiting operation in the switching power supply device of FIG. 10. When the switching element Q1 is cut off after a lag time, that is, during overcurrent limiting operation, the inductor current $I_L$ flowing in the primary windings Lp of the transformer T1 increases in proportion to the input voltage $V_{IN}$, as explained in FIGS. 11(A) and 11(B). In a conventional positive-detection type switching power supply device, when for example the device is used as the power supply for a personal computer in Japan, the 100 V commercial AC power supply is rectified and smoothed for use as the DC input power supply. In other countries, a 200 V AC power supply may be used. On the other hand, only voltages of at most approximately 10 to 20 V are required as the output voltages from the secondary windings Ls or from the auxiliary windings Lb of the transformer T1. When there is deviation in the voltage of the commercial AC power supply, that is, in the input voltage $V_{IN}$, if the higher the input voltage $V_{IN}$ the larger the inductor current $I_L$ which flows when turning off the switching element Q1, problems are posed for power supply safety.

Hence with the aim of correcting for this overshooting in the switching power supply device shown in FIG. 10, a resistance circuit in which resistors R2 and R4 are connected in series is provided. By means of this resistance circuit, the voltage level of the sense resistor Rs is shifted in the positive direction. The amount of level shifting is larger for higher input voltages $V_{IN}$, so that the higher the input voltage $V_{IN}$, the more quickly an overcurrent state can be judged in the stage before the voltage of the sense resistor Rs reaches the overcurrent limiting judgment reference voltage Vth. Hence the overshoot amount ΔV when actually turning off the switching element Q1 can be compensated by this resistance circuit.

However, in a positive detection method in which the level is shifted by a resistance circuit, when considered from the standpoint of reduction of power consumption under light loading or no loading or reduction of standby power during standby, which has emerged as an issue in power supply systems in recent years, the power consumption due to the current flowing from the input power supply $V_{IN}$ (in a normal power supply system, the input power supply $V_{IN}$ is at the highest voltage) through the resistance circuit of the resistors R4, R2, Rs to ground (Gnd) becomes a problem. Hence a method is known in which, in order not to pass unnecessary current in a switching power supply device, while compensating for the phenomenon in which the higher the input voltage $V_{IN}$, the larger is the overcurrent when the switching element Q1 is turned off, as shown in FIG. 12, the current detection signal level is shifted in the negative direction, to achieve reduced power consumption (see for example Japanese Patent Laid-open No. 2003-299351 (page 8, line 2 to page 9, line 24, FIG. 2)).

FIG. 13 is a block diagram showing one example of a negative-detection type switching power supply device of the prior art.

As for example in the case of the switching power supply device disclosed in Japanese Patent Laid-open No. 2003-299351 (page 8, line 2 to page 9, line 24, FIG. 2), a negative-detection type switching power supply device is configured such that current detection means employs a sense resistance Rs to detect the current flowing in the primary windings, or the current flowing in the switching element, as a negative voltage. Hence in the switching power supply device shown in FIG. 13, the signal input terminal for current detection IS and the sense resistor Rs are connected via a resistor Ra. Moreover, the signal input terminal IS is connected to the connection point between the auxiliary windings Lb and the rectifying diode D2, and to the power supply terminal VCC supplying power to the integrated circuit IC, via the resistor Rb and the correction resistor Rc, respectively.

First, the functions of the resistors Ra and Rb are explained (the function of the correction resistor Rc is explained below). As is clear from the circuit configuration in FIG. 13, the larger the current on the primary side, the larger the absolute value of the negative voltage which becomes the current detection signal. The resistors Ra and Rb correspond to the respective resistors R2 and R4 in the positive detection method of FIG. 10, and are provided to apply a negative bias to the current detection signal. During intervals in which the switching element Q1 is turned on, a negative potential appears at the connection point between the auxiliary windings Lb and the rectifying diode D2. This negative potential is insulated from the smoothing capacitor C2 by the rectifying diode D2, and so is proportional to the input voltage $V_{IN}$ (but with the sign inverted). Hence just as when the positive-voltage current detection signal has a positive bias applied in the positive detection method, so in the negative detection method the negative-voltage current detection signal has a negative bias applied, which is proportional to the input voltage $V_{IN}$.

In the positive detection method and the negative detection method, the power consumed in the resistors R4, R2, Rs and in the resistors Rb, Ra, Rs differs greatly. This is because the power consumed in a resistor is proportional to the square of the voltage applied to the resistor ((voltage)$^2$/resistance value), and the applied voltages differ greatly. As explained above, when a commercial AC power supply is rectified and smoothed to obtain an input voltage $V_{IN}$, the value is approximately 100 to 200 V, whereas the output voltage (absolute value) from the auxiliary windings Lb is at most approximately 10 to 20 V, so that the power consumption can be reduced by about two orders of magnitude.

In the power supply control circuit 10 (IC circuit) of FIG. 13, only a portion of the elements comprised by the circuit is shown. Here, the voltage controlled oscillator 14, current comparator 17, and flip-flop circuit 19 are circuits corresponding to the control circuit shown in FIG. 9, a signal inversion circuit 23 is positioned to supply signals to the non-inverting input terminal (+) of the current comparator 17 from the feedback signal VFB detection input terminal FB, and a level shift circuit 24 is provided between the current detection input terminal IS and the inverting input terminal (−) of the current comparator 17. Although omitted in FIG. 13, the power supply control circuit 10 also comprises a zero current detection input terminal ZCD, a terminal VH to which startup current is supplied, and the like.

The voltage controlled oscillator 14 is an oscillator used to determine the switching frequency; and the oscillation frequency is controlled by a feedback signal VFB (this signal is equivalent to a so-called error signal), output from the feedback circuit 25, resulting from amplification of the difference between the voltage output to the load and the voltage setting. The frequency characteristic is such that, in the range in which the load is judged to be light (for example, when the feedback signal VFB is 0.9 V or less), the frequency is proportional to the voltage of the feedback signal VFB, and declines substantially linearly to the minimum frequency. When the load is heavy, the frequency is constant (the maximum frequency). The feedback circuit 25 is the same as that shown in FIG. 10.

The larger the feedback signal VFB, the heavier the load is judged to be, so that increasing the output current such that the output voltage reaches the target voltage setting is difficult, and so the switching frequency is raised so as to enable accommodation of large changes in the load current. And the smaller the feedback signal VFB, the lighter the load with a small output current is judged to be, so that the switching frequency is set low.

When the feedback signal VFB is smaller than a prescribed value (for example 0.4 V), switching is stopped, and a feedback signal VFB voltage higher than the above prescribed value of 0.4 V is awaited. No switching is performed, so that electric charge is not supplied to the secondary-side output capacitor C3, and current is supplied only to the load, so that the output voltage falls. As a result the difference between the output voltage and the voltage setting increases, and the voltage value of the feedback signal VFB rises.

FIG. 14 shows the configuration of the signal inversion circuit 23 of the switching power supply device shown in FIG. 13. The signal inversion circuit 23 comprises an operation amplifier circuit 26, resistors R11 and R12, and a reference voltage supply E5, as shown in FIG. 14.

Here, the feedback signal VFB is supplied from the feedback circuit 25 via the input terminal FB as a voltage signal of 1 to 2 V, suitable for the positive detection method. The signal is inverted and amplified by the signal inversion circuit 23, to be converted into an internal signal VFB2 of 2 to 1.5 V conforming to the negative detection method. The voltage values used by the signal inversion circuit 23 are examples used to explain the range of values which signals may take, and signals are not limited to these values.

FIG. 15 shows the configuration of the level shift circuit 24 in the switching power supply device shown in FIG. 13. The level shift circuit 24 comprises a resistor R13 for protection from static electricity and a series circuit of resistors R14, R15 for voltage division, connected between the internal reference voltage E6 and the signal input terminal for current detection IS, as well as Zener diodes D5, D6 which ground the connection point between the resistors R13 and R14. Here, the negative-voltage current detection signal (the signal itself is a voltage) VIS applied to the signal input terminal IS outputs to the current comparator 17 as an internal signal VIS2, which has been level-shifted to a positive potential, from the connection point of the resistors R14 and R15.

In this way, the current detection signal VIS is supplied to the signal input terminal for current detection IS as a negative voltage (0 to −1 V); because the IC circuit, which does not have a negative-voltage supply, cannot actually handle a negative-voltage signal, the level shift circuit 24 of FIG. 15 shifts the signal level to a positive potential (2 to 1.5 V).

At this time, the resistance values of the resistors R11, R12 and the like are adjusted such that the output level conforms to this current detection signal, even for the signal inversion circuit 23 which processes the feedback signal VFB.

Next, the function of the correction resistor Rc is explained. The correction resistor Rc adds a positive (positive voltage) offset voltage (bias) to the current detection signal VIS, so that in effect the switching frequency determined by the integrated circuit IC is lowered, in order to reduce the power consumption during light loading or no loading or the standby power during standby. Below, the manner in which the correction resistor Rc lowers the switching frequency is explained.

FIGS. 16(A)-16(C) are signal waveform diagrams explaining the correction operation of the current detection signal VIS in a switching power supply device. Here, the signal VFB3 is a hypothetical signal used for explanation, and is equivalent to the above-described internal signal VFB2, with operating range in the positive voltage range (for example 2 to 1.5 V), level-shifted such that the upper limit is 0 V to conform with the operation range of the current detection signal VIS, which is a negative voltage. It may be regarded as the result of inversion of the feedback signal VFB.

Here it is assumed that the oscillation frequency of the voltage controlled oscillator 14 is controlled by the feedback signal VFB supplied to the power supply control circuit 10.

First, as shown in FIG. 16(A), cases in which correction by the correction resistor Rc is not performed are considered. At this time, the turn-on time ratio of the switching element Q1 and the value of the feedback signal VFB are in a state of balance such that the voltage output to the load Vout is at the voltage setting. The switching frequency is then determined by the magnitude of the feedback signal VFB.

Next, suppose that the correction resistor Rc is added and correction is suddenly applied to the state in FIG. 16(A). In this case, the current detection signal VIS is a signal which starts to decline from a larger positive voltage than that in FIG. 16(A). On the other hand, the feedback signal VFB, that is, the signal VFB3 in the figure, cannot change rapidly, so that the same voltage level continues for a time. The switching element Q1 is not turned off until the current detection signal VIS reaches VFB3, so that as shown in FIG. 16(B), the turn-on time ton of the switching element Q1 is lengthened (the turn-on time ton is the interval from the time at which the current detection signal VIS begins to decline until the signal VFB3 is reached). At this time, if the switching frequency remains unchanged, then the turn-off time within one period is shortened, and the turn-on ratio of the switching element Q1 is increased. As a result, the voltage output to the load rises, the feedback signal VFB is reduced, and the absolute value of the feedback signal VFB3 is also reduced.

When the feedback signal VFB becomes small, the switching frequency declines, and the time ratio falls, so that the initial turn-on time ratio shown in FIG. 16(A) is approached. Hence as shown in FIG. 16(C), there is balancing at a new switching frequency, and finally it becomes the same turn-on time ratio as in FIG. 16(A). At this time, the feedback signal VFB and the absolute value of the shifted voltage value VFB3 are smaller than the values before correction. In this way, the frequency controlled by the voltage controlled oscillator 14 goes lower, and the turn-on time determined by the current comparator 17 is also lengthened.

In the above-described negative-detection type switching power supply device, current flowing in the correction resistor Rc during light loading remains a problem with respect to promoting energy efficiency. That is, because the correction resistor Rc in a switching power supply device of the prior art is connected to the power supply terminal VCC, current always flows from the power supply terminal VCC through the correction resistor Rc and the series circuit of the resistors Ra and Rs, and through the correction resistor Rc and the series circuit of the resistor Rb and auxiliary windings Lb, to ground (GND), so that there is the problem of the occurrence of power losses.

Offsets from two sources are applied to the current detection signal VIS: one from the output voltage of the auxiliary windings Lb via the resistor Rb, and another from the voltage of the power supply terminal VCC via the correction resistor Rc. The voltage of the power supply terminal VCC is proportional to the output voltage Vout, and the output voltage Vout is controlled so as to be a constant voltage, so that the voltage of the power supply terminal VCC is also a constant voltage. On the other hand, because the output voltage of the auxiliary windings Lb is proportional to the input voltage $V_{IN}$, the value essentially fluctuates. Hence there is the problem that the correction resistor Rc has a complex effect on overcurrent detection.

That is, overcurrent detection is performed by comparing the voltage signal from the current detection input terminal IS to a certain reference voltage; however, it is difficult to adjust the circuit constants such that the comparison provides a constant result, regardless of the value of the input voltage $V_{IN}$. This is because the voltage of the auxiliary windings Lb, which is proportional to the input voltage $V_{IN}$, is applied to one end of the resistor Rb, and this resistor Rb is connected to the input terminal IS in parallel with the correction resistor Rc, to one end of which is applied a constant voltage (the power supply voltage VCC of the power supply control circuit 10, a regulated voltage), so that both affect the current detection signal VIS, and constantly adjustment of circuit constants is difficult.

This invention has been made in light of the above problems, and has as an object of the provision of a switching power supply device in which, when an external correction circuit is added and the switching frequency during light loading is adjusted from outside, losses in the correction circuit are reduced as compared with the prior art, and moreover adjustment is possible without affecting overcurrent limits or other characteristics.

Further objects and advantages of the invention will be apparent from the following description of the invention.

SUMMARY OF THE INVENTION

In order to resolve the above problems, this invention provides a switching power supply device, comprising: a DC power supply; a transformer which supplies power to a secondary-side load according to a voltage setting; a switching element which is connected in series to primary windings of the transformer; a feedback circuit which outputs to the primary side of the transformer based on a feedback signal obtained by amplifying the difference between the voltage setting and the voltage output to the load; switching power supply control means for performing on/off control of the switching element based on the feedback signal; and current detection means for detecting the value of current flowing in the switching element as a voltage signal with polarity with which as the current value increase, the voltage relative to the reference potential of the switching power supply control means is reduced, the DC power supply being connected to the primary windings of the transformer, the DC voltage input from the DC power supply being turned on and off by the switching element to generate a pulsating current, and the desired output power being supplied to the load according to the voltage setting.

The switching power supply control means comprises a signal input terminal for current detection to which the voltage signal is input; a current comparator which compares the feedback signal from the feedback circuit with the voltage signal; an oscillation circuit which, when loading is judged to be light based on the magnitude of the feedback signal, lowers the operating frequency such that the switching interval of the switching element is lengthened; a control circuit which generates a control signal having a frequency and pulse width according to the operating frequency of the oscillation circuit and the comparison result of the current comparator, to drive the switching element; and an output terminal which outputs the control signal, the switching power supply device further comprising a correction circuit, which acts only during on intervals of the switching element, and which applies a positive offset voltage to the voltage signal output from the current detection means.

In this switching power supply device, correction is performed by adding an offset to the voltage signal used to detect current values by the correction circuit only during intervals in which the switching signal turns on the switching element.

By means of this invention, losses occurring in the correction circuit occur only during control signal on intervals, so that power losses can be reduced compared with methods of the prior art.

BRIEF DESCRIPTION OF THE DRAWINGS

FIGS. 16(A)-16(C) are signal waveform diagrams explaining an operation to correct the current detection signal VIS in a switching power supply device.

DETAILED DESCRIPTION OF THE EMBODIMENTS

Figure 1:
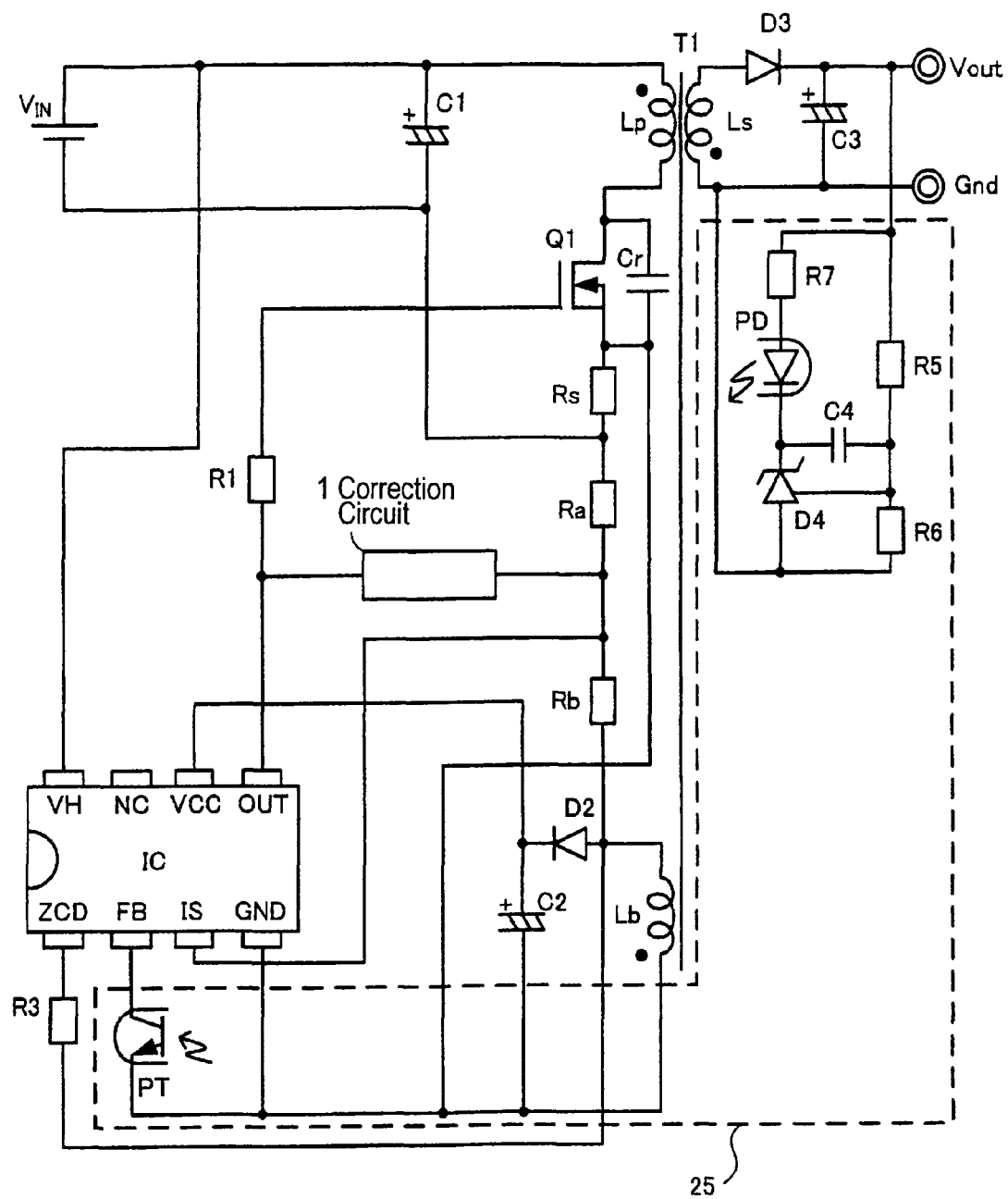
FIG. 1 is a block diagram showing an example of a switching power supply device of the invention.

Hereinafter, the invention is explained referring to the drawings.

Embodiment 1

Figure 2:
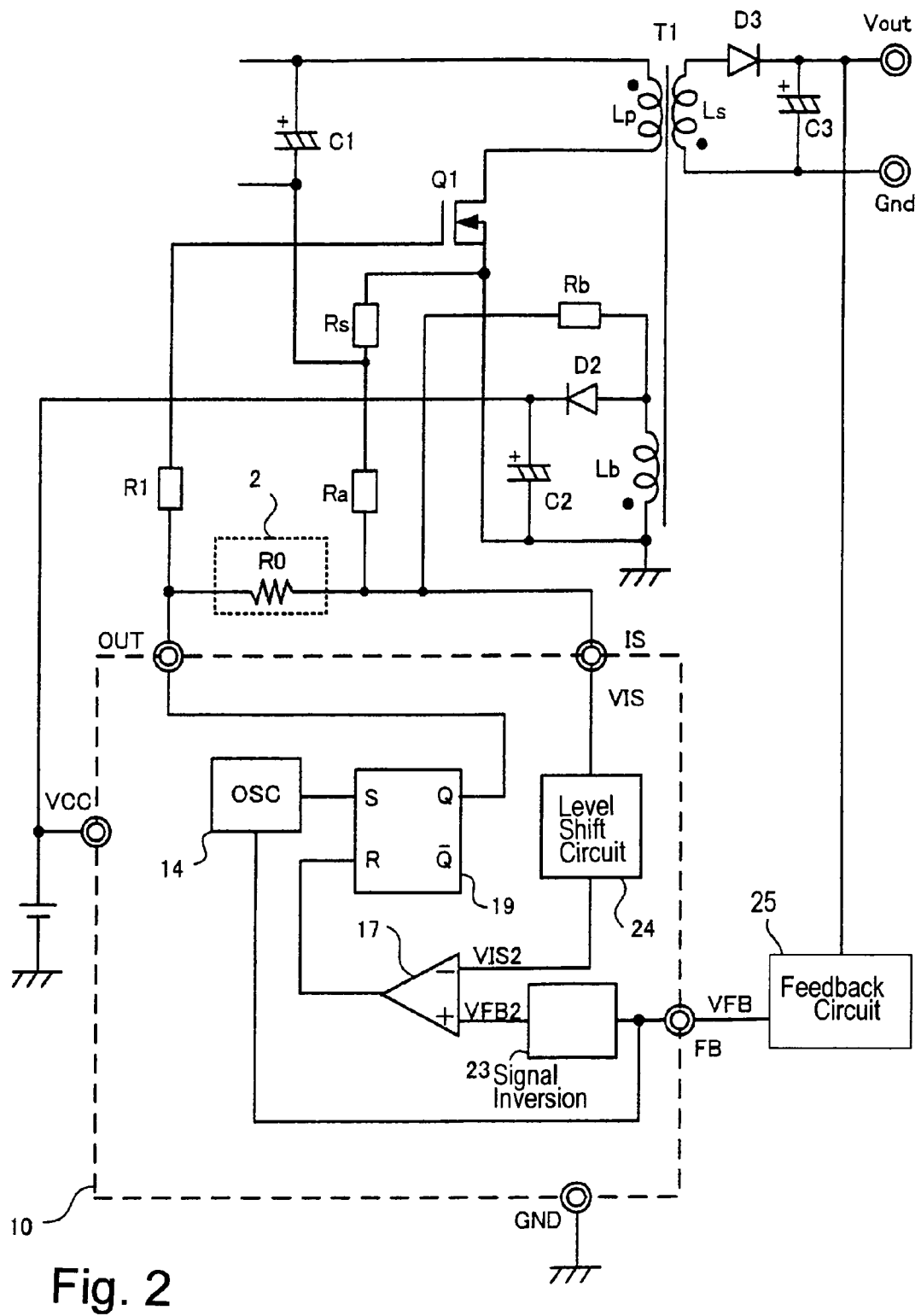
FIG. 2 is a block diagram showing the switching power supply device of the first aspect, comprising a correction circuit employing a resistor.

FIG. 1 is a block diagram showing an example of a switching power supply device of the invention, and FIG. 2 is a block diagram showing the switching power supply device of Embodiment 1, comprising a correction circuit employing a resistor.

First, the switching power supply device comprising a correction circuit 2 employing only a resistor R0, as shown in FIG. 2, is explained. Here, the correction circuit 2 is connected as an external circuit to the integrated circuit IC.

As shown in FIG. 2, the integrated circuit IC comprising the power supply control circuit (power supply control means) has a current comparator 17, which compares a feedback signal VFB from a feedback circuit 25 with a voltage signal from a current detection input terminal IS; a voltage controlled oscillator 14, which, when the load is judged to be a light load based on the magnitude of the feedback signal VFB, lowers the operating frequency such that the switching intervals of the switching element Q1 are lengthened; and, a flip-flop circuit 19, which generates control signals having a frequency and pulse width corresponding to the operating frequency of the voltage controlled oscillator 14 and the comparison result of the current comparator 17, to drive the switching element Q1. The power supply control circuit 10 also has a signal inversion circuit 23 and a level shift circuit 24. These are the same as those shown in FIG. 13, and so a detailed explanation is omitted. The resistor R0, serving as the correction circuit 2, is connected between the output terminal OUT of the power supply control circuit 10 and the signal input terminal for current detection IS.

Figure 13:
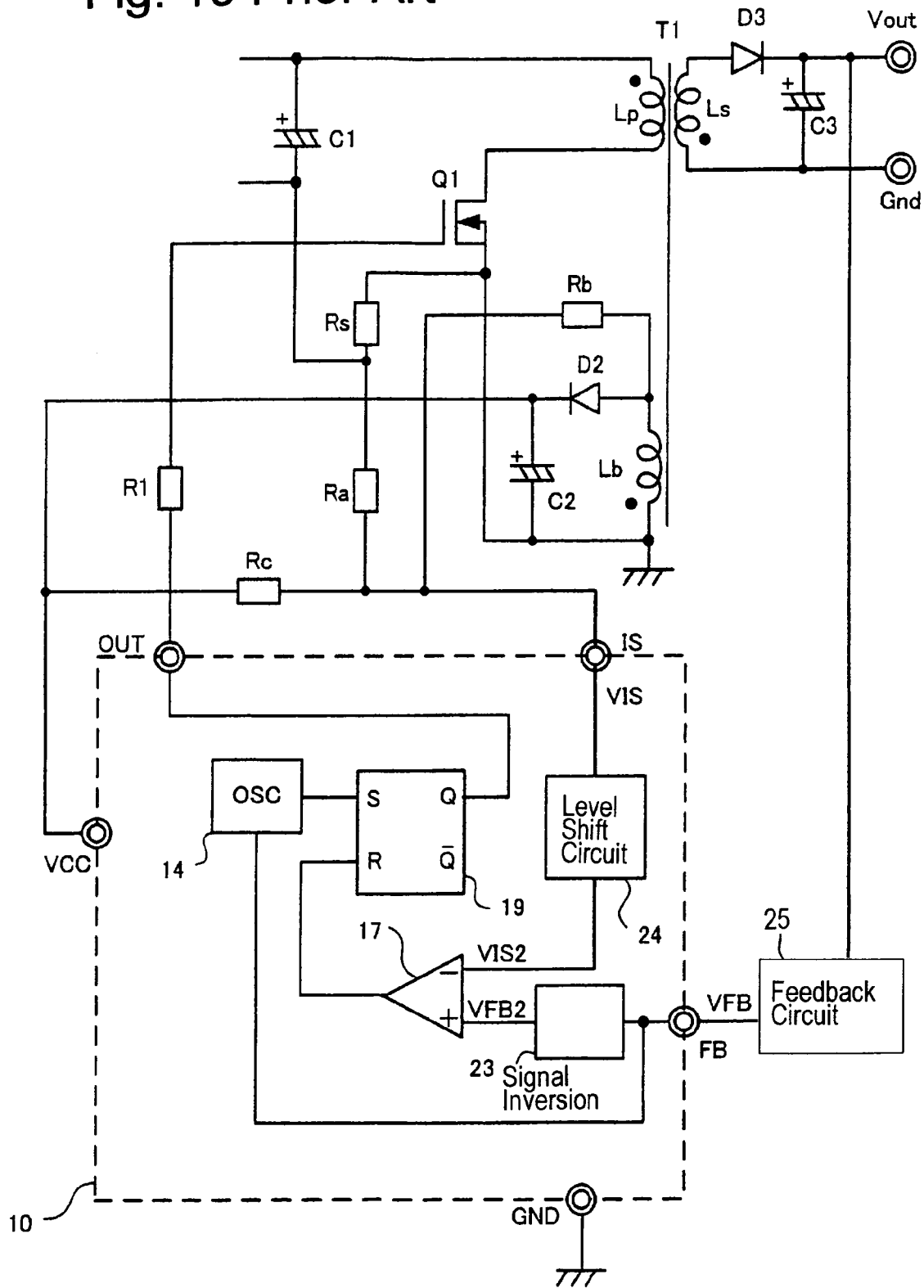
FIG. 13 is a block diagram showing an example of a negative-detection type switching power supply device of the prior art.
Figure 14:
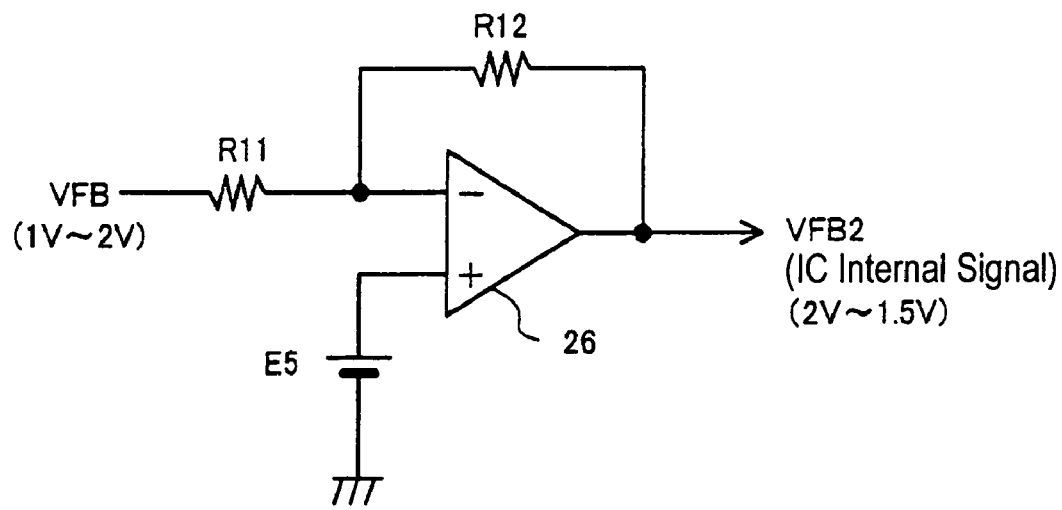
FIG. 14 shows the configuration of the signal inversion circuit in the switching power supply device of FIG. 13.
Figure 15:
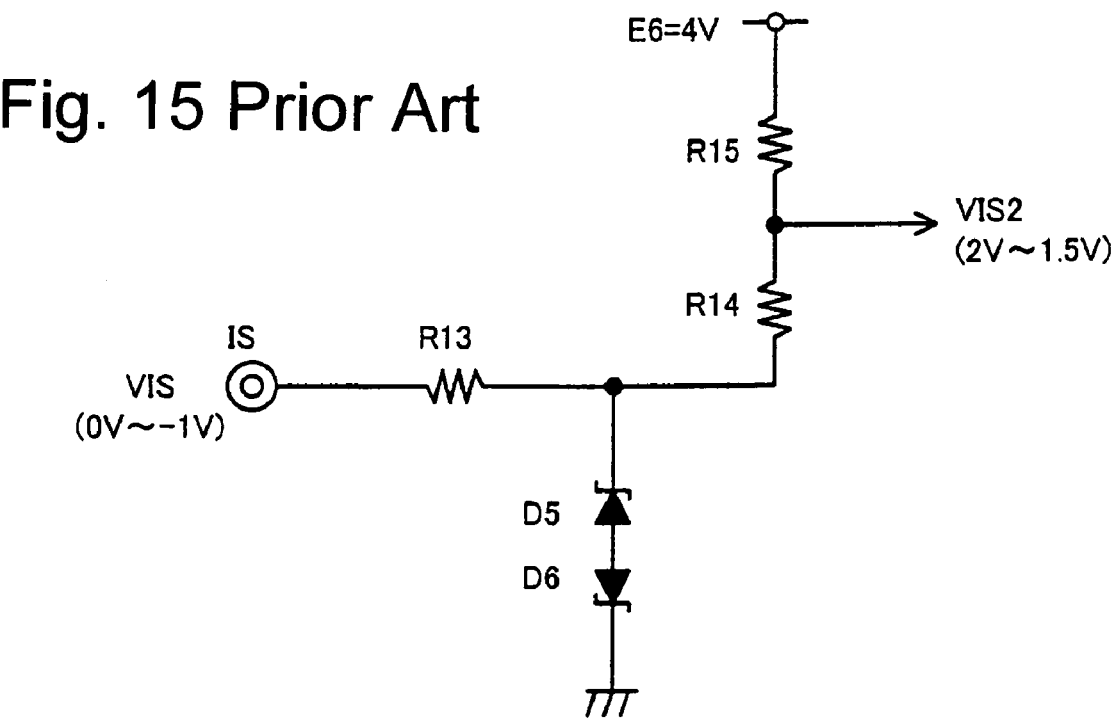
FIG. 15 shows the configuration of the level shift circuit in the switching power supply device of FIG. 13.

Similarly to that shown in FIG. 13, the switching power supply device of FIG. 1 is a negative-detection type switching power supply device. On the other hand, the switching power supply device shown in FIG. 13 differs in that a correction circuit 1 is connected such that a positive offset voltage is applied to the current detection signal VIS output from the sense resistor Rs, which is the current detection means, and is configured so as to act only during on intervals of the switching element Q1. Otherwise the configuration is as explained for FIG. 13; hereinafter, corresponding portions are assigned the same reference numbers, and explanations are omitted. As the power supply control circuit 10 itself in FIG. 1, an integrated circuit IC configured as in the prior art is used.

In the case of the switching power supply device of Embodiment 1 shown in FIG. 2, current flows in the correction resistor R0 only during on intervals of the switching element Q1, that is, only during intervals in which the switching signal output from the output terminal OUT is high, and no current flows during off intervals. (Strictly speaking, because the potential at the connection point between the resistors Rs and R0 during off intervals is the result of division of the output voltage from the auxiliary windings Lb by the resistors Rb, Ra, Rs, a small current flows, although it is smaller than the current during on intervals.) Consequently, losses can be reduced compared with the prior art. In particular, the lighter the loading, the smaller is the turn-on time ratio, so that power losses due to current flowing in the correction resistor R0 can be further decreased.

Figure 3A:
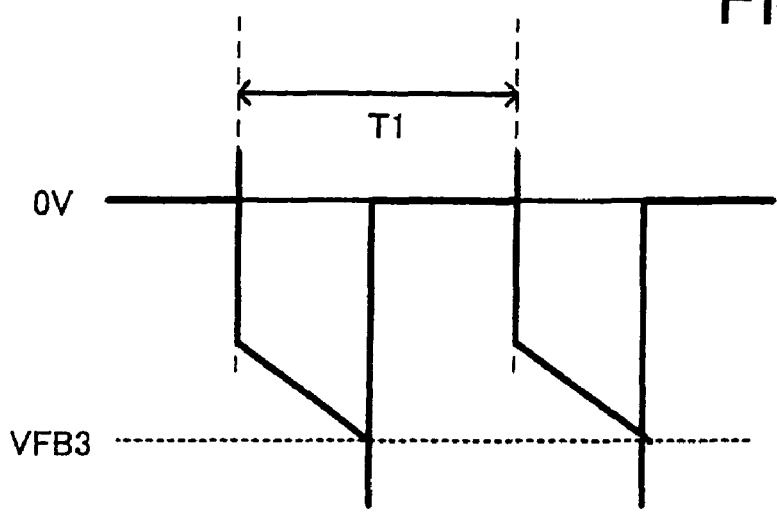
FIGS. 3(A) and 3(B) show operating waveforms of current comparator input signals in the switching power supply device of FIG. 2.
Figure 3B:
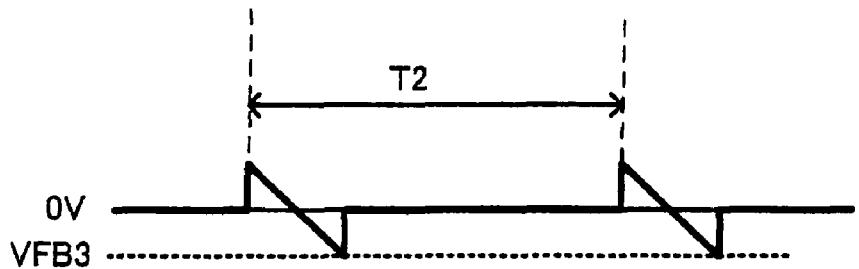

FIGS. 3(A) and 3(B) show operating waveforms of input signals to the current comparator 17 in the switching power supply device of FIG. 2.

In FIG. 3(A), a current detection signal (voltage signal) during heavy loading is shown. This current detection signal is a voltage signal of polarity which declines with respect to a reference potential (in this case, ground potential) of the switching power supply device as the current flowing in the switching element Q1 increases, and upon reaching the judgment reference voltage VFB3 of the current comparator 17 (the same as the hypothetical signal VFB3 in the explanation of FIGS. 16(A)-16(C)), and causes the switching element Q1 to be turned off. During the instant in which a switching signal to turn on the switching element Q1 has been output but the switching element Q1 has not yet turned on, correction of the current detection signal by the resistor R0 begins and the current detection signal takes on a positive value, but when the switching element turns on and a current detection signal with large absolute value corresponding to the heavy load appears, the corrected current detection signal VIS becomes a negative signal in the initial stage.

In FIG. 3(B), a current detection signal during light loading is shown. Similarly to FIG. 3(A), at the instant the switching element Q1 is turned on, correction of the current detection signal by the resistor R0 starts, and the current detection signal VIS becomes positive. Because the absolute value of the current detection signal is not large for a light load, the interval during the time wherein the corrected current detection signal VIS is positive is a comparatively longer fraction of the cycle.

Here, not only is the absolute value of the judgment reference voltage VFB3 small, but the switching interval T2 during light loading is long compared with the switching interval T1 for heavy loading.

During intervals in which the switching element Q1 is off, there is no correction by the resistor R0, so that the current detection signal VIS is at ground potential (0 V). The resistance value of the resistor Rb is higher than the values of the other resistors R0, Ra, Rs, and the effect on current values and power consumption are smaller than for other resistors, and so to simplify the explanation, the effect of the resistor Rb is ignored (similarly in FIG. 4 and FIG. 6 below). The correction circuit 1 need not be an external circuit, but may be incorporated into the integrated circuit IC.

Embodiment 2

Figure 4:
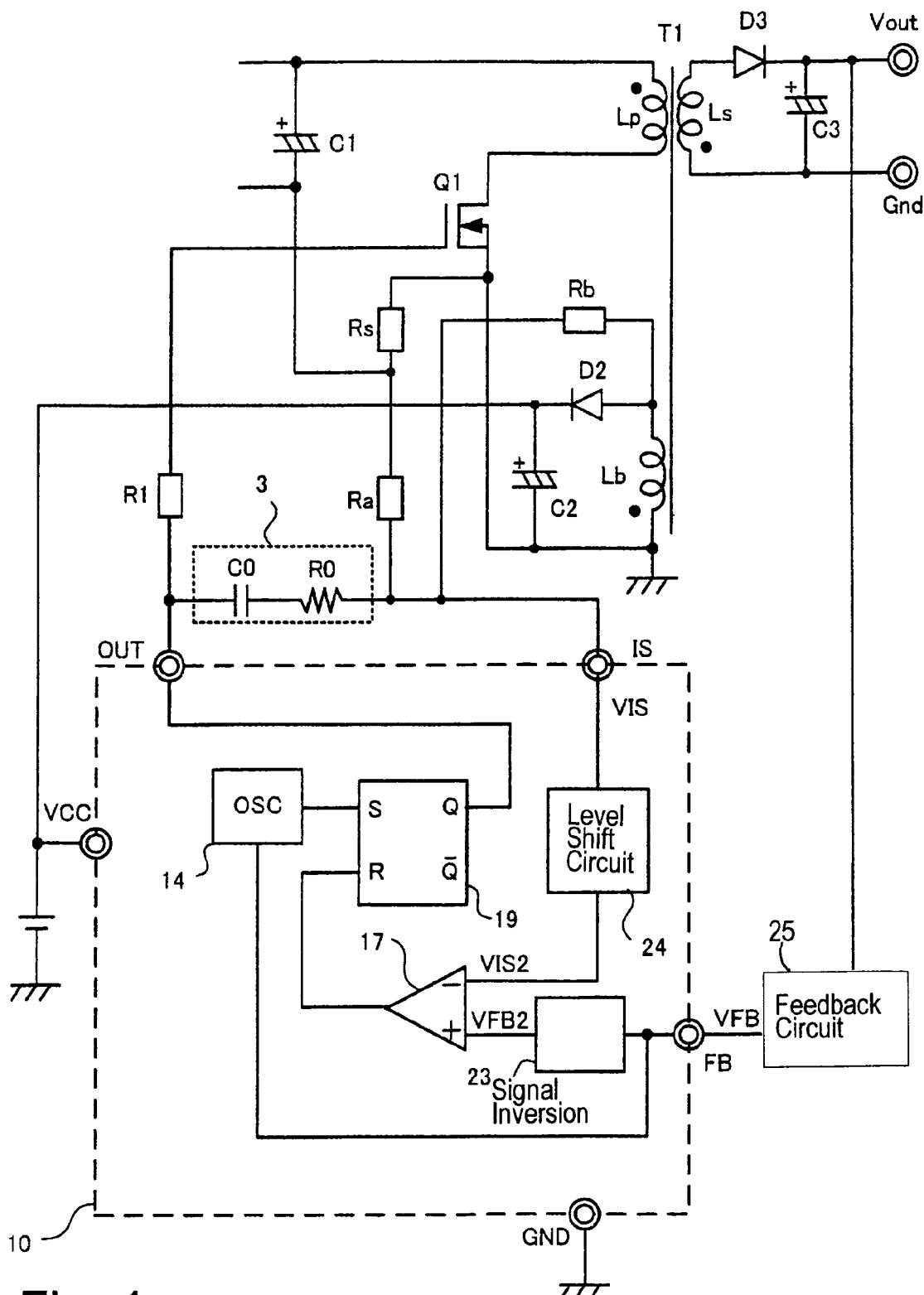
FIG. 4 is a block diagram showing the switching power supply device of the second aspect, comprising a correction circuit employing a resistor and a capacitor.
Figure 5A:
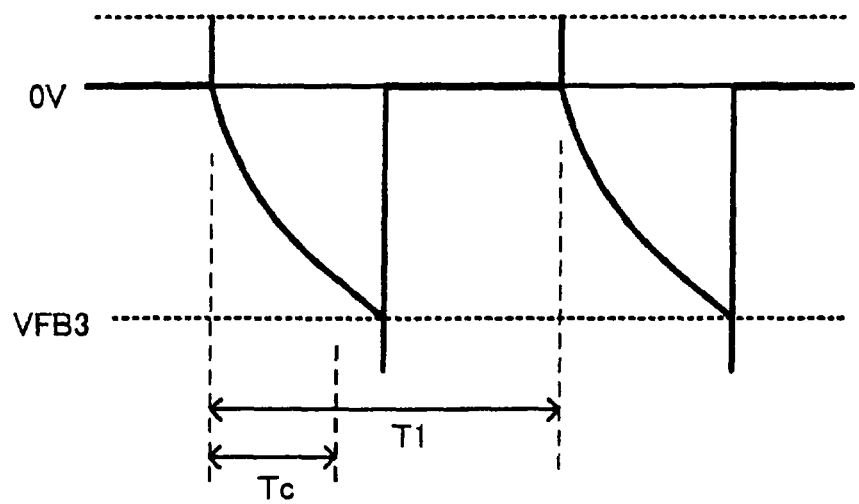
FIGS. 5(A) and 5(B) show the operating waveforms of current comparator input signals in the switching power supply device of FIG. 4.
Figure 5B:
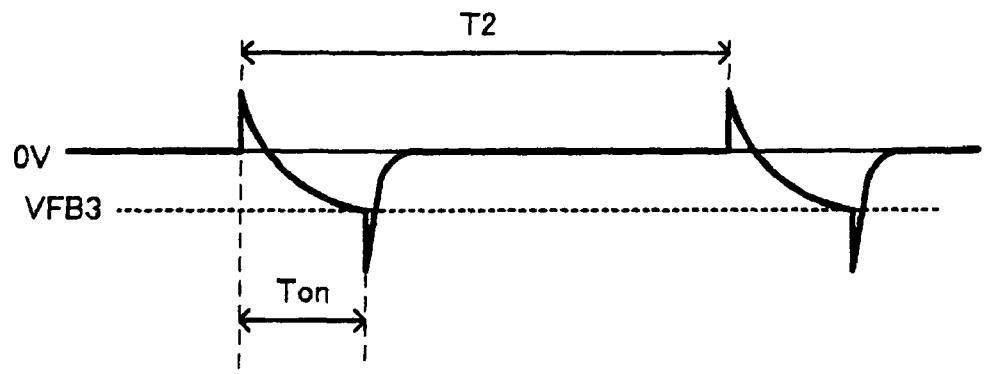

FIG. 4 is a block diagram showing the switching power supply device of embodiment 2, comprising a correction circuit employing a resistor and a capacitor; FIGS. 5(A) and 5(B) show operating waveforms of input signals to the current comparator 17 of the switching power supply device of FIG. 4.

Here, the correction circuit 3 comprises the series circuit of the resistor R0 and capacitor C0. In this case, the time constant determined by the resistor R0 and capacitor C0 is made shorter than the switching period T1 set in the power supply control circuit 10.

In FIG. 5(A), the current detection signal (voltage signal) during heavy loading is shown; in FIG. 5(B), the current detection signal during light loading is shown. When the switching element Q1 is turned on, the switching signal changes from low to high, current flows through the capacitor C0 and resistor R0 of the correction circuit 3, and an offset occurs in the current detection signal. Thereafter, charging of the capacitor C0 ends, and current no longer flows in the correction circuit 3. In this way, because of the fact that only a current to charge the capacitor C0 flows in the correction circuit 3 (or from another perspective, because the correction circuit 3 forms a differentiating circuit or a high-pass filter), power losses in the correction circuit 3 occurring during on intervals of the control signal can be further reduced.

Overcurrent detection is performed by comparing the current detection signal VIS corrected by the correction circuit 3 with the reference voltage serving as the overload protection (OLP) judgment reference (judgment reference voltage Vth); however, because during the correction interval Tc of the correction circuit 3 the correction circuit 3 operates as a differentiating circuit immediately after turn-on of the switching element Q1, there is no effect on the overcurrent limiting action.

Embodiment 3

Figure 6:
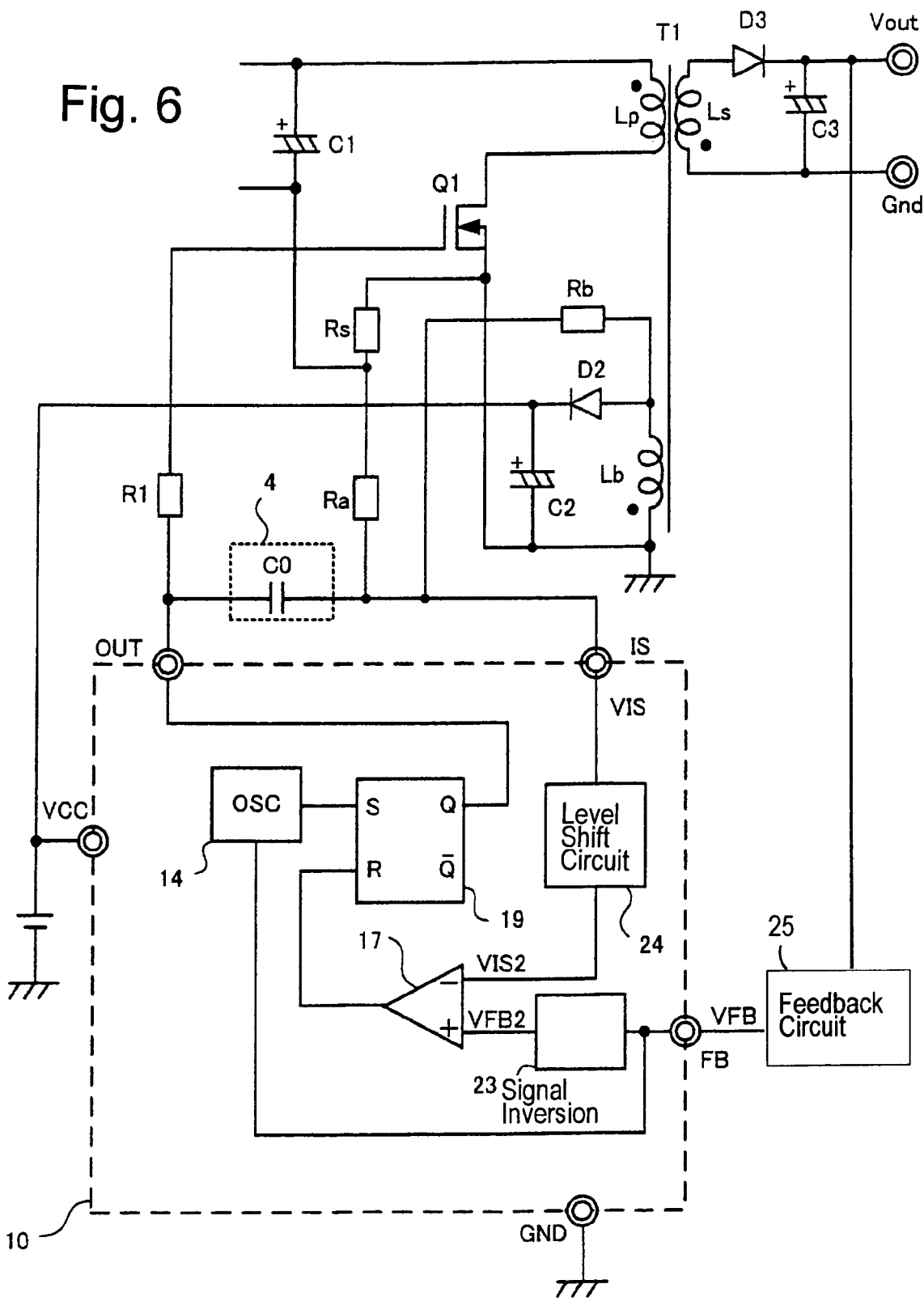
FIG. 6 is a block diagram showing the switching power supply device of the third aspect, comprising a correction circuit employing a capacitor.

FIG. 6 is a block diagram showing the switching power supply device of Embodiment 3, in which the correction circuit in FIG. 1 employs a capacitor.

When the correction circuit 4 comprises only a capacitor C0, the operation is substantially the same as the correction circuit 3, in which a resistor R0 and capacitor C0 are connected in series. This is because in the actual correction circuit 4, parasitic resistance components in the circuit, as well as the sense resistance Rs, or the resistors Ra and Rb connected in series, and other resistance components are equivalent in operation to a resistance component.

In the switching power supply devices of Embodiment 2 and Embodiment 3 explained above, the on time is lengthened during heavy loading in which overcurrents may be a problem, so that by means of a configuration comprising a capacitor C0 as in the correction circuits 3 and 4 shown in FIG. 4 and FIG. 6, by setting the time constant to be shorter than the on time, the effect of the correction circuit 3 or 4 can be eliminated before the current detection signal reaches the judgment reference voltage Vth. As a result, there is no need to consider the effect of the correction circuit 3 or 4 relative to the overcurrent detection level, and only the resistors Rs, Ra, Rb need be considered, so that circuit constant adjustment is simplified. However, the case of a correction circuit 2 comprising only a resistor R0 (FIG. 2), such as in Embodiment 1, is separate.

Embodiment 4

Figure 7:
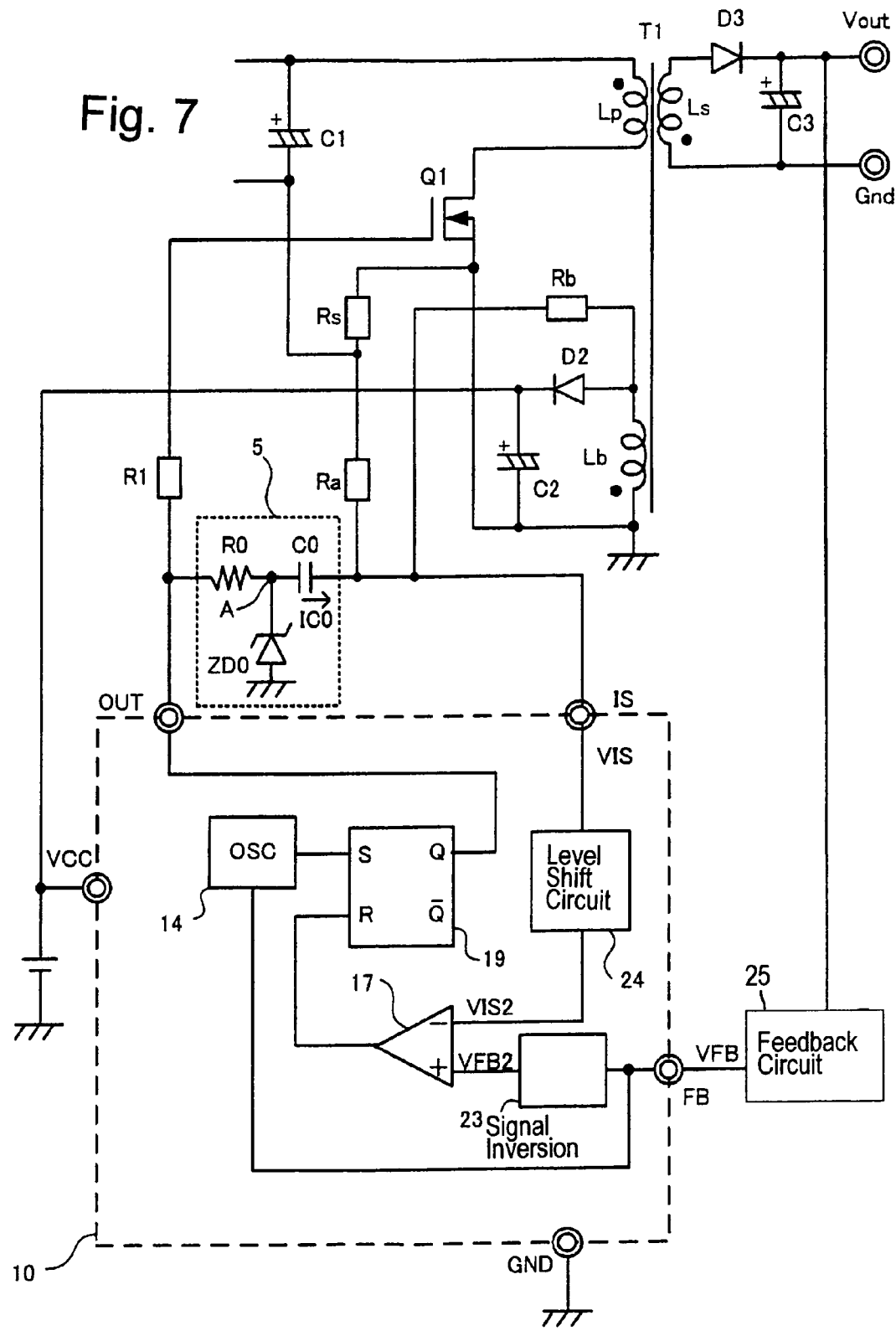
FIG. 7 is a block diagram showing the switching power supply device of the fourth aspect, comprising a correction circuit employing a resistor, a capacitor, and a Zener diode.

FIG. 7 is a block diagram showing the switching power supply device of Embodiment 4, comprising a correction circuit employing a resistor, a capacitor, and a Zener diode.

Here, the correction circuit 5 is formed from the resistor R0, capacitor C0, and Zener diode ZD0. In this case, it is desirable that the time constant determined by the resistor R0 and capacitor C0 be set to approximately the same as the switching interval T1 set in the power supply control circuit 10, or to a length not more than T1; but the time constant may be longer than the switching interval T1. The Zener voltage VZD of the Zener diode ZD0 is set lower than the high level of the driving signal Q1 output from the output terminal OUT.

FIGS. 8(A)-8(D) show operating waveforms of different portions of the switching power supply device of FIG. 7.

Figure 8A:
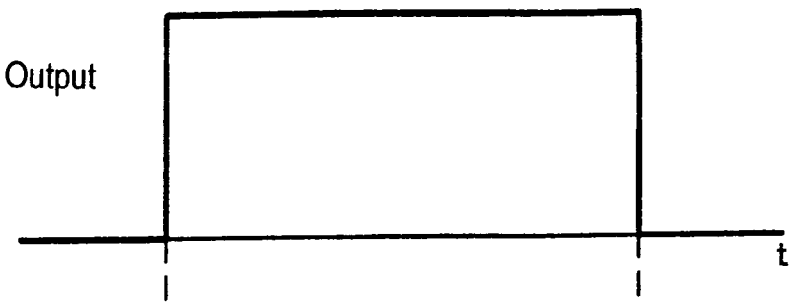
FIGS. 8(A)-8(D) show operating waveforms of different portions of the switching power supply device of FIG. 7.
Figure 8B:
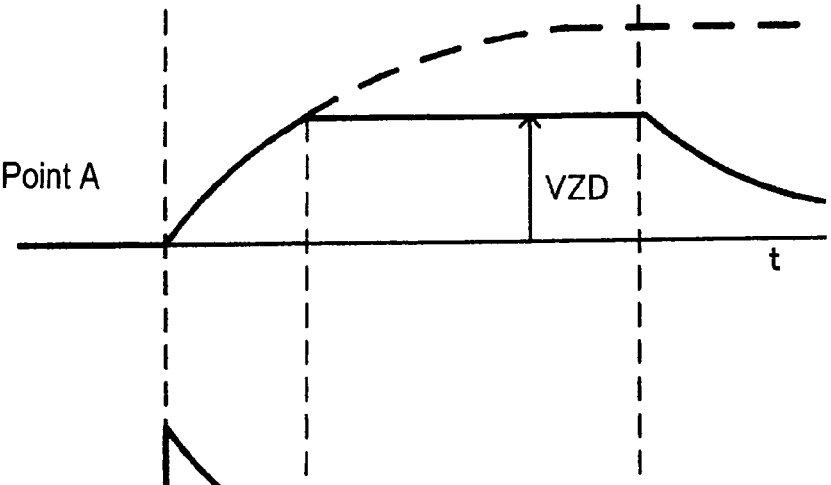

As shown in FIG. 8(A), when the switching element Q1 is turned on, the voltage of the switching signal from the output terminal OUT of the power supply control circuit 10 changes from low to high (time t1). Then, similarly to the case of the above-described correction circuit 3 (see FIG. 4), a current IC0 flows through resistor R0 to the capacitor C0 of the correction circuit 5, and this current IC0 is injected from midway in the series circuit comprising the resistors Rs, Ra, Rb, so that an offset occurs in the current detection signal VIS. Then, the capacitor C0 is charged, and the voltage at point A in FIG. 7 rises (see FIG. 8(B)).

Figure 8C:
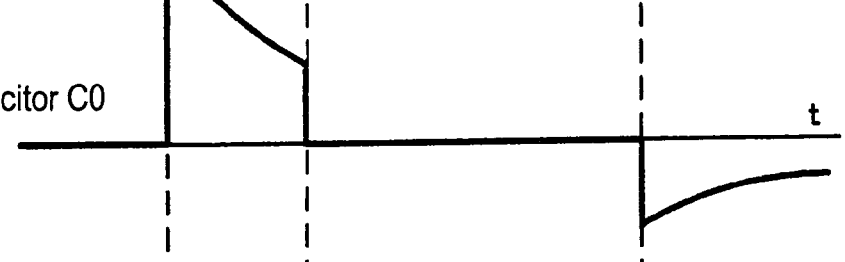
Figure 8D:
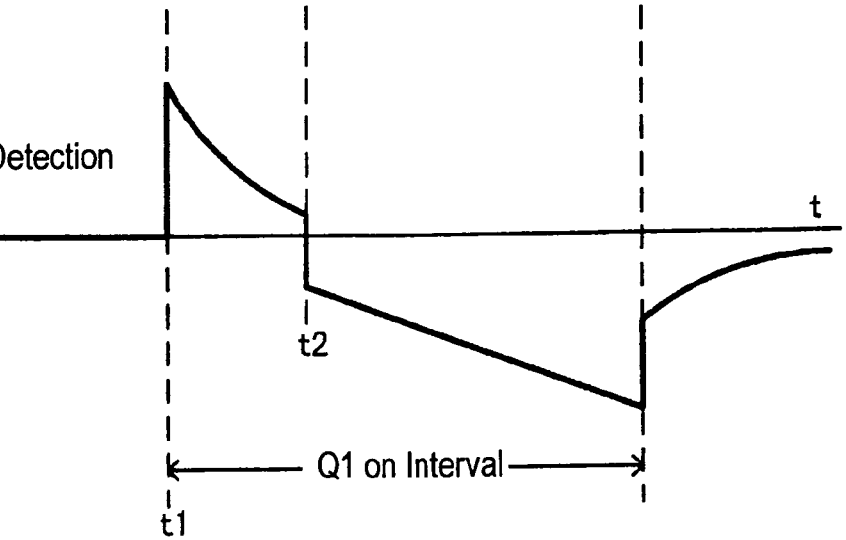
Figure 9:
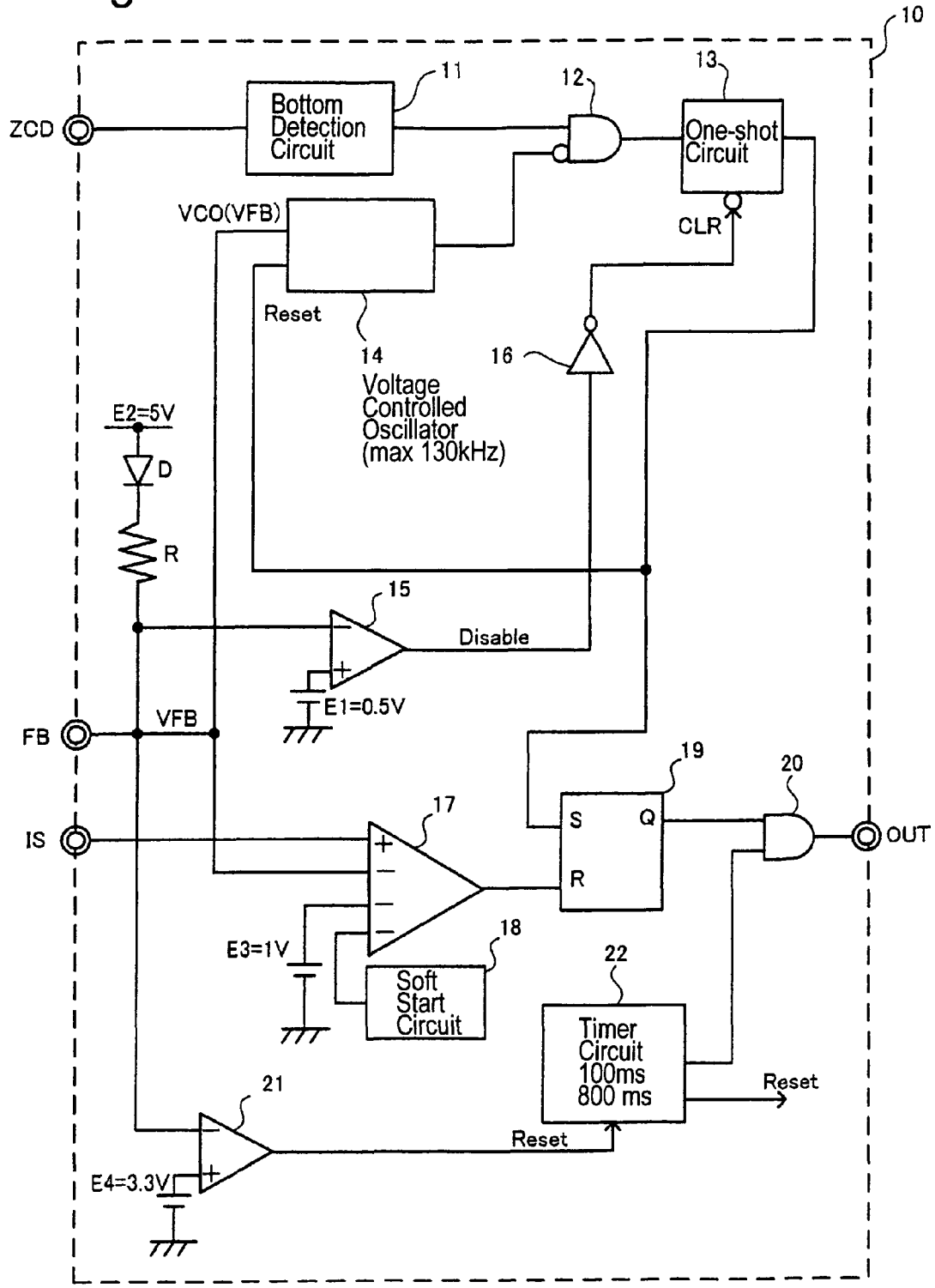
FIG. 9 is a block diagram showing the control circuit of a quasi-resonant switching power supply disclosed in Japanese Patent Laid-open No. 2007-215316 (page 1, line 15 to page 13, line 16, FIG. 4, FIG. 5).
Figure 10:
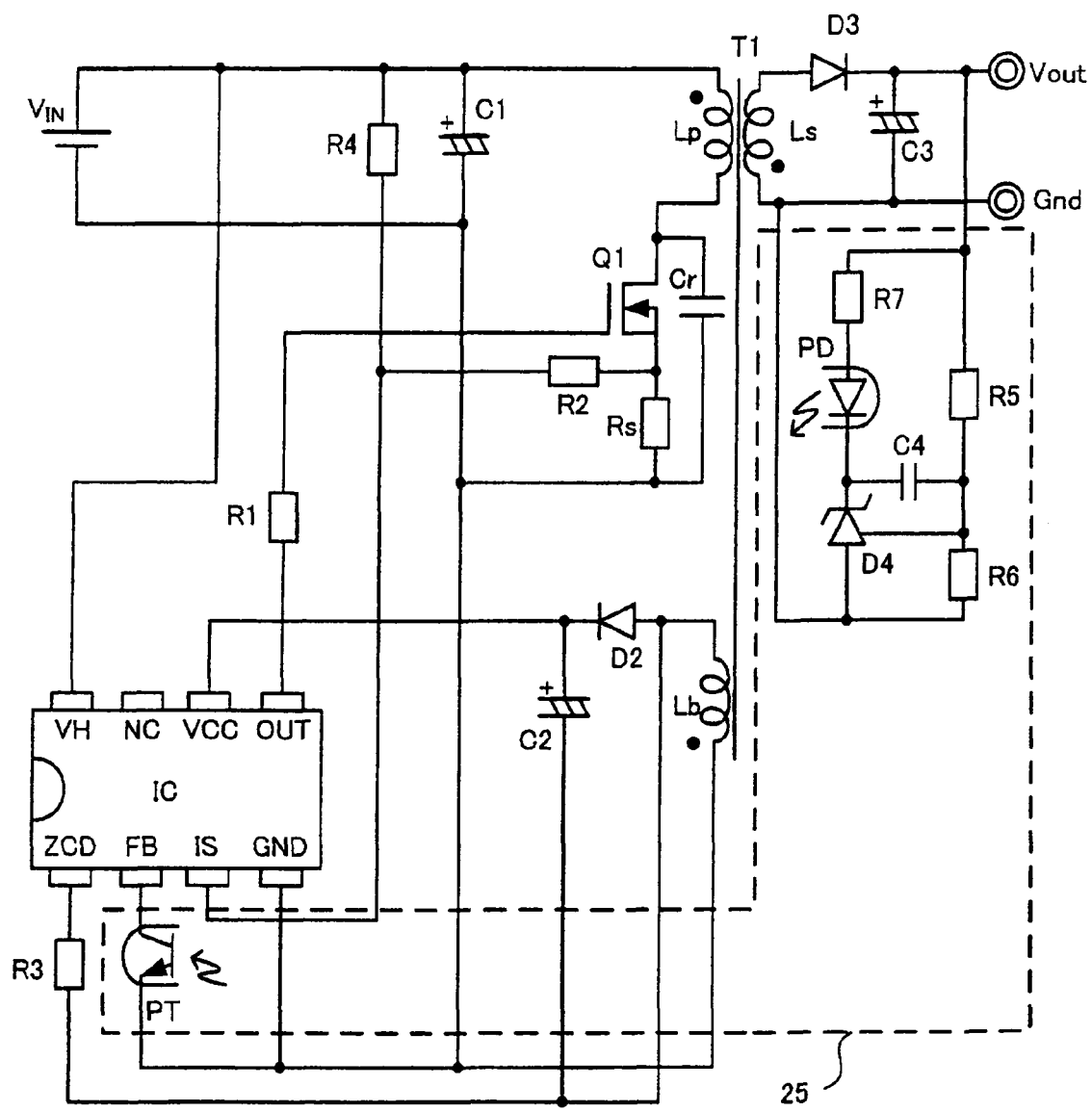
FIG. 10 is a block diagram showing one example of a positive-detection type switching power supply device of the prior art.
Figure 11A:
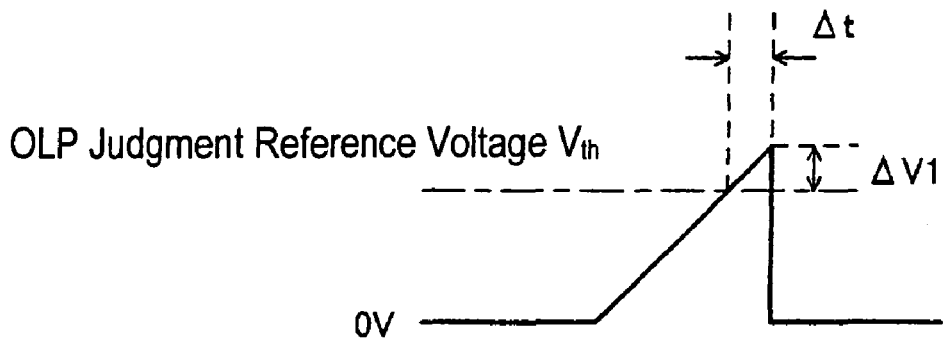
FIGS. 11(A) and 11(B) show primary-side current waveforms corresponding to different input voltages.
Figure 11B:
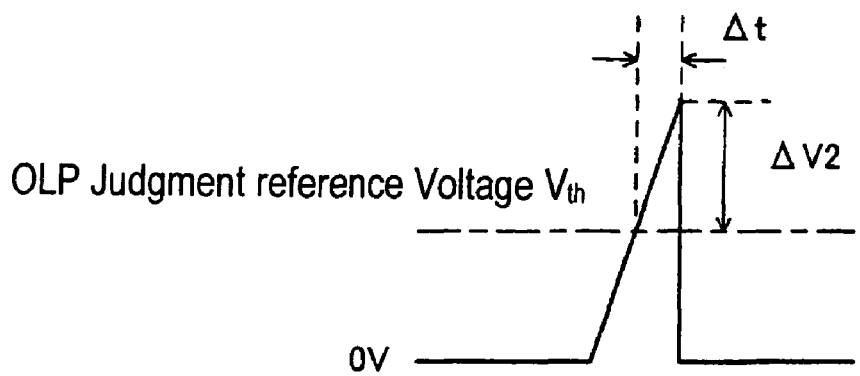
Figure 12:
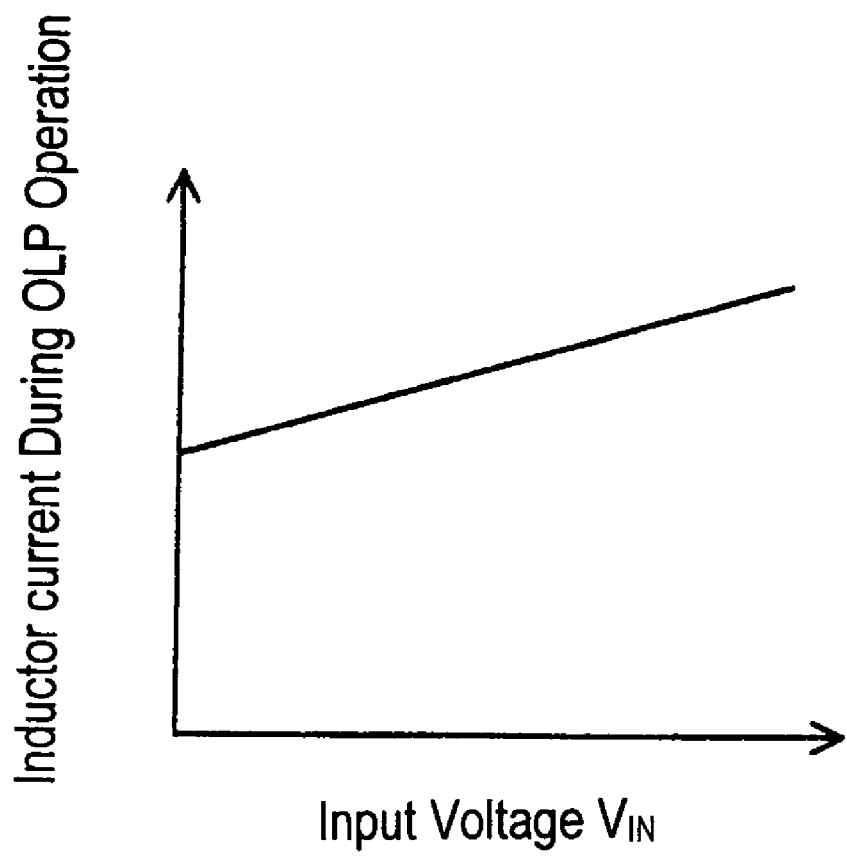
FIG. 12 shows changes in the inductor current during overcurrent limiting operation in the switching power supply device of FIG. 10.

Thereafter, when the voltage at point A reaches the Zener voltage VZD of the Zener diode ZD0, the current flowing in the resistor R0 is shifted from the capacitor C0 to the Zener diode ZD0, and as shown in FIG. 8(C), the current no longer flows into the capacitor C0. As a result, as shown in FIG. 8(D), after time t2 at which the current flowing in resistor R0 shifts to the Zener diode ZD0, the offset which had been present in the current detection signal VIS due to the correction circuit 5 no longer occurs.

Thus in Embodiment 4, by adjusting the Zener voltage VZD of the Zener diode ZD0, the time at which an offset occurs in the current detection signal VIS due to the correction-circuit 5 can be freely adjusted. Hence even when the time constant determined by the resistor R0 and capacitor C0 is set to be longer than the switching interval T1, by selecting the Zener voltage VZD appropriately, the interval in which an offset occurs due to the correction circuit 5 can be set to immediately after turn-on of the switching element Q1, and as a result there is no effect on the overcurrent limiting action. Hence compared with the correction circuit 3 of FIG. 4, the resistor R0 and capacitor C0 can be selected from a broader range of resistance values or capacitance values, and adjustment is made easier.

The disclosures of Japanese Patent Applications No. 2007-307743 filed on Nov. 28, 2007 and No. 2008-114705 filed on Apr. 25, 2008 are incorporated as a reference.

While the invention has been explained with reference to the specific embodiments of the invention, the explanation is illustrative and the invention is limited only by the appended claims.

What is claimed is:

1. A switching power supply device, comprising:
   a DC power supply;
   a transformer having primary windings, and supplying power to a load at a secondary side of the transformer according to a setting voltage;
   a switching element connected in series to the primary windings of the transformer;
   a feedback circuit connected to the secondary side and outputting to the primary side of the transformer a feedback signal obtained by amplifying a difference between the setting voltage and a voltage output to the load;
   a switching power supply control device for performing on/off control of the switching element based on the feedback signal;
   a current detection device for detecting a value of current flowing in the switching element as a voltage signal with polarity, said current detection device detecting a voltage relative to a reference potential of the switching power supply control device such that as the current value increases, the voltage relative to the reference potential is reduced; and
   a correction circuit attached to the switching power supply control device, said correction circuit acting only during on intervals of the switching element, and applying a positive offset voltage to the voltage signal output from the current detection device.

2. The switching power supply device according to claim 1, wherein the switching power supply control device comprises:
   a signal input terminal for current detection, to which the value of current following to the switching element is input as the voltage signal;
   a current comparator for comparing the feedback signal from the feedback circuit with the voltage signal;
   an oscillation circuit, which, when loading is judged to be light based on a magnitude of the feedback signal, lowers an operating frequency such that a switching interval of the switching element is prolonged;
   a control circuit, which generates a control signal having a frequency and pulse width according to an operating frequency of the oscillation circuit and the comparison result of the current comparator, and drives the switching element; and
   an output terminal for outputting the control signal.

3. The switching power supply device according to claim 2, wherein the DC power supply is connected to the primary windings of the transformer, the DC voltage input from the DC power supply being turned on and off by the switching element to generate a pulsating current, and desired output power being supplied to the load according to the setting voltage.

4. The switching power supply device according to claim 1, wherein the correction circuit is a resistor connected between an output terminal and a signal input terminal for current detection of the switching power supply control device.

5. The switching power supply device according to claim 1, wherein the correction circuit is a capacitor connected between an output terminal and a signal input terminal for current detection of the switching power supply control device.

6. The switching power supply device according to claim 1, wherein the correction circuit is a series circuit of a resistor and a capacitor, connected between an output terminal and a signal input terminal for current detection of the switching power supply control device.

7. The switching power supply device according to claim 1, wherein the correction circuit is externally connected to an integrated circuit comprising the switching power supply control device.

8. The switching power supply device according to claim 1, wherein the correction circuit is incorporated within an integrated circuit comprising the switching power supply control device.

9. The switching power supply device according to claim 1, wherein the correction circuit comprises a series circuit of a resistor and a capacitor, and a Zener diode having a cathode connected to a connection point between one end of the resistor and one end of the capacitor; the other end of the resistor is connected to an output terminal; the other end of the capacitor is connected to a signal input terminal for current detection; and an anode of the Zener diode is connected to a reference potential of the switching power supply control device.

* * * * *